United States Patent [19]

Jilsen

[11] Patent Number: 5,295,938
[45] Date of Patent: Mar. 22, 1994

[54] ARRANGEMENT FOR TOOL MAGAZINES FOR SHEET METAL WORKING MACHINES

[75] Inventor: Per Q. Jilsen, Gothenburg, Sweden

[73] Assignee: Pulimax AB, Gothenburg, Sweden

[21] Appl. No.: 888,972

[22] Filed: May 26, 1992

[30] Foreign Application Priority Data

May 30, 1991 [SE] Sweden .............................. 9101654-3

[51] Int. Cl.$^5$ ............................................ B23Q 3/155
[52] U.S. Cl. ........................................ 483/29; 72/446; 83/698
[58] Field of Search ......................... 483/28, 29, 1, 5, 6; 72/442, 446; 83/550, 551, 552, 549, 563, 76.7

[56] References Cited

U.S. PATENT DOCUMENTS

| | | | |
|---|---|---|---|
| 3,745,646 | 7/1973 | Kristiansson | 483/29 |
| 3,765,291 | 10/1973 | Stenfeld | 83/563 |
| 4,103,414 | 8/1978 | Herb et al. | 483/28 |
| 4,182,022 | 1/1980 | Kristiansson | 483/29 |
| 4,779,329 | 10/1988 | Nordquist et al. | 483/29 |

FOREIGN PATENT DOCUMENTS

| | | | |
|---|---|---|---|
| 3331667 | 3/1985 | Fed. Rep. of Germany | 83/563 |
| 0231532 | 11/1985 | Japan | 72/446 |
| 0263525 | 10/1990 | Japan | 83/552 |

Primary Examiner—Z. R. Bilinsky
Attorney, Agent, or Firm—Emmanuel J. Lobato; Robert E. Burns

[57] ABSTRACT

A punching machine has an upper (3) and a lower (4) tool magazine of the carousel type. Coaxially interacting punching tools (10) and die tools (19) are transferred in conjunction with tool changing from take-up positions in the upper and lower magazine to working positions respectively in the upper reciprocating punch holder (45, 49) of the machine and in the lower fixed die holder (29) of the machine. The upper punch holder is divided along an axial plane into one fixed parts and one radially moving part (45) relative to the magazine. The lower die holder is executed in the form of an uninterrupted ring. After the transfer of a punching tool from the upper magazine to the working position in the punch holder, the magazine ($D_1$) with the other punching tools accommodated in it is raised in order to ensure the necessary clearance between these magazined tools and any projections and irregularities on the workpiece as it is fed and moved between the magazines during working. The lower die tool is transferred from its position accommodated in the lower magazine to a ready position (B) vertically beneath its final working position, and it is then displaced vertically to the working position in order to be taken into the annular die holder. The arrangement permits very rapid tool changing without the risk of interference between the magazined punching/die tools and the workpiece as it is fed during working.

10 Claims, 9 Drawing Sheets

ARRANGEMENT FOR TOOL MAGAZINES FOR SHEET METAL WORKING MACHINES

The present invention relates to an arrangement for tool magazines for machines intended for the working of sheet metal by punching, nibbling and similar operations in accordance with the introduction to Patent Claim 1 below.

The tool magazines for these machines is usually a turret magazine comprising an upper magazine and a lower magazine usually co-axial with it. The interacting upper and lower tools operate with vertical axes and are picked up in this position from the respective magazines, which are able to rotate about similarly vertical axes. The tool changing can be program-controlled and arranged, for example, in the manner described in Swedish Patent Application SE 8604196-9, in conjunction with which the respective interacting pairs of tools are picked up in axially divided tool holders.

The tool magazines themselves may be arranged in different positions relative to the striking mechanism and the tool holder of the sheet metal working machine, although in most cases the positioning of the magazines in the jaws of the machine is preferred, which leaves free space for the guide devices for the sheet billet in front of and at the side of the frame of the machine. When working the sheet metal, it is thus necessary to take account of the fact that the sheet metal will extend during certain operations into the jaws of the machine between the tool magazines.

It is usually preferred to limit the travel of the punching tool in the machines in question, which is advantageous with regard to the design of the reciprocating drive mechanism of the tool. However, this limitation means that the upper reciprocating tool (the punching tool) will be situated relatively close to the upper surface of the sheet metal in its upper position during the working operation. This upper position is also the position adopted by the punching tool when changing tools, and thus also after retraction into the upper turret magazine. This means that the upper tools in the magazine will be situated relatively close to the upper surface of a metal sheet which extends beneath the upper tool magazine in the jaws of the machine. The metal sheet is normally supported in a flat position with the help of a supporting device, which also extends into the jaws of the machine, although if the metal sheet is not entirely flat, or if it has been provided with folded edges or other projecting parts after another operation, the situation may arise in which the metal sheet makes contact with the under side of the punching tools accommodated in the upper magazine.

In order to avoid this disadvantage, it is proposed in accordance with the invention that the upper tool magazine, when in the magazining position, should be situated at a level higher than the level which corresponds to the changing position of the tools and, when tools are being changed, should be lowered to the level for the changing of a tool which has been advanced to the changing position, in conjunction with which tool changing takes place in the manner described in the aforementioned patent application Ser. No. 8604196-9, corresponding to U.S. Pat. No. 4,779,329.

This arrangement eliminates all risk of any punching tool, when in the magazining position, coming into contact with the upper surface of the metal sheet when the magazine is rotated to a new position for tool changing, or when the metal sheet is moved during the working process with the tools held in the tool holders, which permits an increased changing speed without a corresponding increase in inconveniences as a result of collisions between punching tools and the workpiece. In order to be able to utilize this increased changing speed and, by so doing, to achieve a shorter changing time for the punching tools, the invention also proposes in accordance with a further characteristic an improved and positive-action arrangement for locking the moving part of the upper divided tool holder to the fixed part of same. This characteristic means that both parts of the tool holder are locked to one another with the help of a single device in the form of a balanced-action, symmetrical and self-locking gripping device actuated by a single control device so arranged that, after locking of both parts of the tool holder, it is released from the tool holder, thereby freeing the latter to be rotated to the desired adjustment position. The symmetrical self-locking gripping device operates without the effect of spring devices and joins together the two parts of the tool holder, with the punching tool accommodated therein, to form a very functionally stable unit which can be used with advantage for the desired rapid tool changing.

As a further characteristic for the purpose of achieving the aforementioned rapid and stable tool changing, the lower die tool which interacts with the punch is so arranged, after having been displaced in a radial direction from the lower tool magazine, as to adopt a ready position vertically directly beneath its working position, and as to be displaced from this ready position in a straight line in a vertical direction into the working position, in which the die tool is accommodated accurately in an unbroken annular holder. The tool is supported in this holder by means of a vertically moving device in order to absorb any vertical loading. The fact that the die tool is displaced vertically into the ready position provides an opportunity to achieve the highly accurate and stable retention of the tool in its working position. What the arrangement means as regards the stable retention of the tool in its working position is a significant advance over previously disclosed technology, in accordance with which in one previously disclosed case a punching die is supported in the ready position on a swivelling holder and is transferred from there in the working plane of the die tool into a laterally open die holder, such as that in accordance with SE 7606636-4, for example. The vertically adjustable attachment of the die tool can be a considerable advantage, especially for forming operations, and may even be necessary in certain cases in order to release the die tool from the workpiece.

In order to support the metal sheet during working, a supporting table or suitable supporting devices may be arranged in a conventional manner in the working plane of the lower die tool.

In a preferred embodiment the holding ring for the upper tool is so arranged as to be raised with the help of a cross-shaped yoke, which is raised by a central pressure cylinder while being guided by axially guiding sliding devices. In a further preferred embodiment, the gripping device for locking the parts of the tool holder to one another comprises a toggle joint connected to the operating device which actuates a couple of hook links which are pivotally attached to the moving part of the tool holder and are so arranged as to engage in recesses on the fixed part of the tool holder, in conjunction with which, with the gripping device in its locked position, the toggle joint has moved past its dead point and is in contact with a stop on the moving part, thereby providing self-locking.

This linkage system on the moving part of the tool holder is situated, when in the locked position, within a cylindrical boundary surface for the tool holder, such that this can be caused to rotate without obstruction by other devices situated outside the aforementioned cylindrical boundary surface.

In a further embodiment the lower die tool is supported in the ready position on a vertically moving piston and is displaced by this piston into a working position in which the tool is accommodated in its annular holder. This cylindrical piston is divided axially so that its upper part with the die tool can be rotated while maintaining the attachment to the lower par of the piston.

The lower part of the piston is attached in an appropriate embodiment to a vertically adjustable slide for the adjustment of the die tool in an upper working position and a lower ready position.

Further distinctive features and advantages of the object of invention can be appreciated from the following description and drawings, which relate to an illustrative embodiment.

Figure 1:
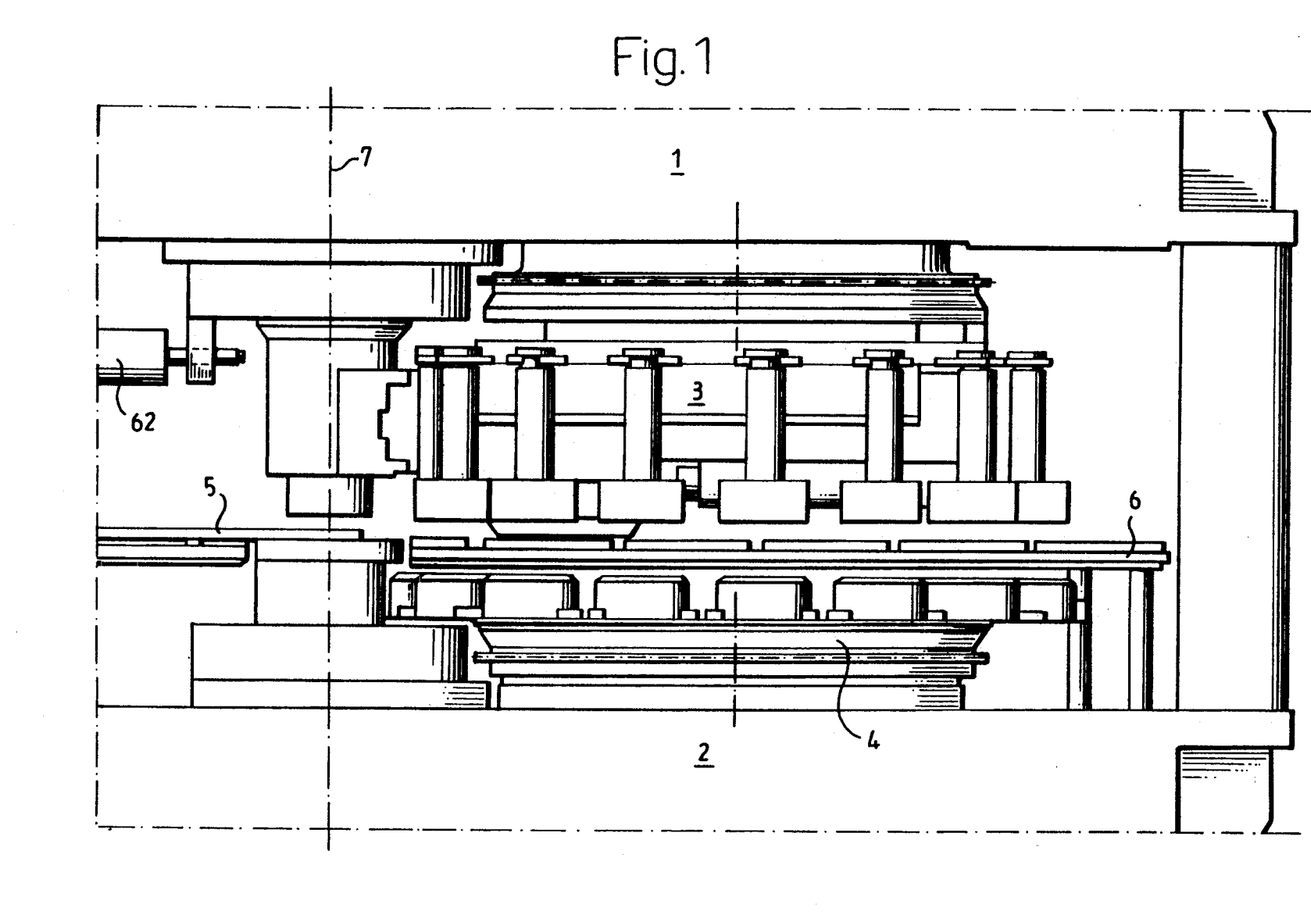
FIG. 1 is a schematic side view of an upper and a lower tool magazine in accordance with the invention mounted in the partially shown jaws in the frame of a portal machine for working sheet metal.

FIG. 1 shows the upper punch magazine 3 attached to the upper frame part 1 and the die magazine 4 attached to the lower frame part 2 of a punching machine. The tool magazines are mounted in this case in the jaws of the frame of a portal machine. The flat-formed material (metal sheet) intended for working has the designation 5. The metal sheet 5 rests on a supporting table 6. The centre-line of the tool holders of the machine has the designation 7. The upper and lower tool holders of the machine are capable of rotating about this centreline constituting an axis.

Figure 2:
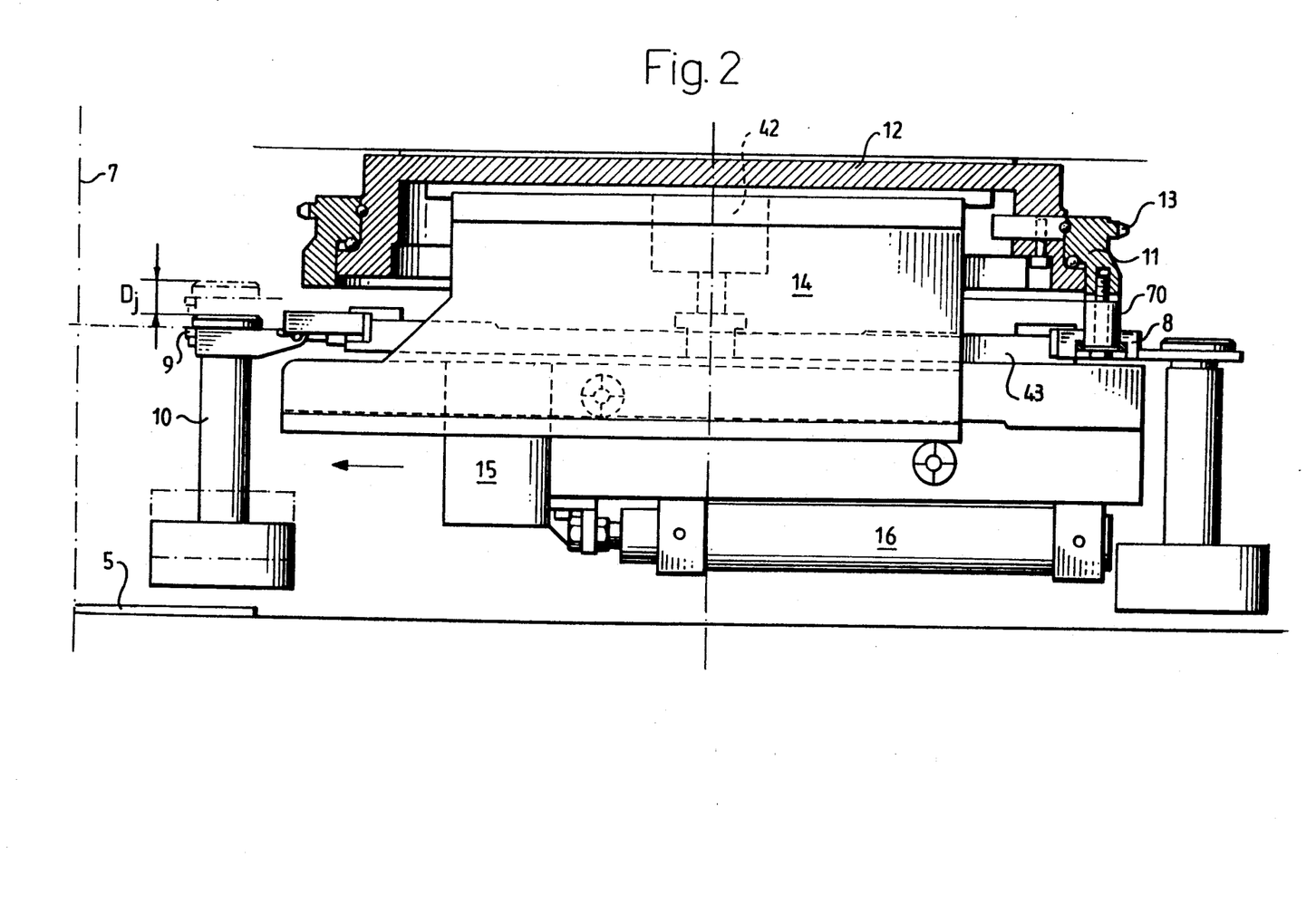
FIG. 2 is a partial longitudinal section through the upper tool magazine.

FIG. 2 shows the upper tool magazine in greater detail. The magazine consists of a ring 8 with tool carriers 9 for the punching tools 10. These tool carriers 9 engage flats on the shanks of punching tools 10 and are arranged radially around the periphery of the ring 8 at regular intervals. The ring 8 is supported in a rotatable fashion at 11 on an attachment 12 fixed in a stationary fashion to the underside of the upper frame part of the machine. The ring 8 with its bearing part 11 can be rotated with the help of a chain transmission 13 in order to position a desired tool in the changing position. The ring 8 is shown in the changing position in FIG. 2, although it can be raised from this position for a distance $D_1$, in conjunction with which all the punches contained in the magazine are raised to the necessary level to ensure that the punches, when in the magazining position, are situated at the necessary vertical distance from the workpiece (metal sheet) with any protrusions and folded edges, etc., which may be present on it when the metal sheet is moved relative to the punch magazine during working. The tools are raised with the help of a lifting device in the form of a ring 8 attached to the tool carrier of the magazine, with a cruciform yoke 43 situated inside the ring connected to a centrally positioned pressure cylinder 42. During lifting, the ring 8 is guided by means of axially guiding slide devices 70.

A mechanism 14 for punch changing is rigidly attached to the stationary attachment 12. This mechanism comprises a slide-mounted gripping device 15, which is operated so as to provide radial movement with the help of a drive device 16 in the form of a pressure cylinder. FIG. 2 shows the gripping device in a position ready to begin a change operation.

Figure 8:
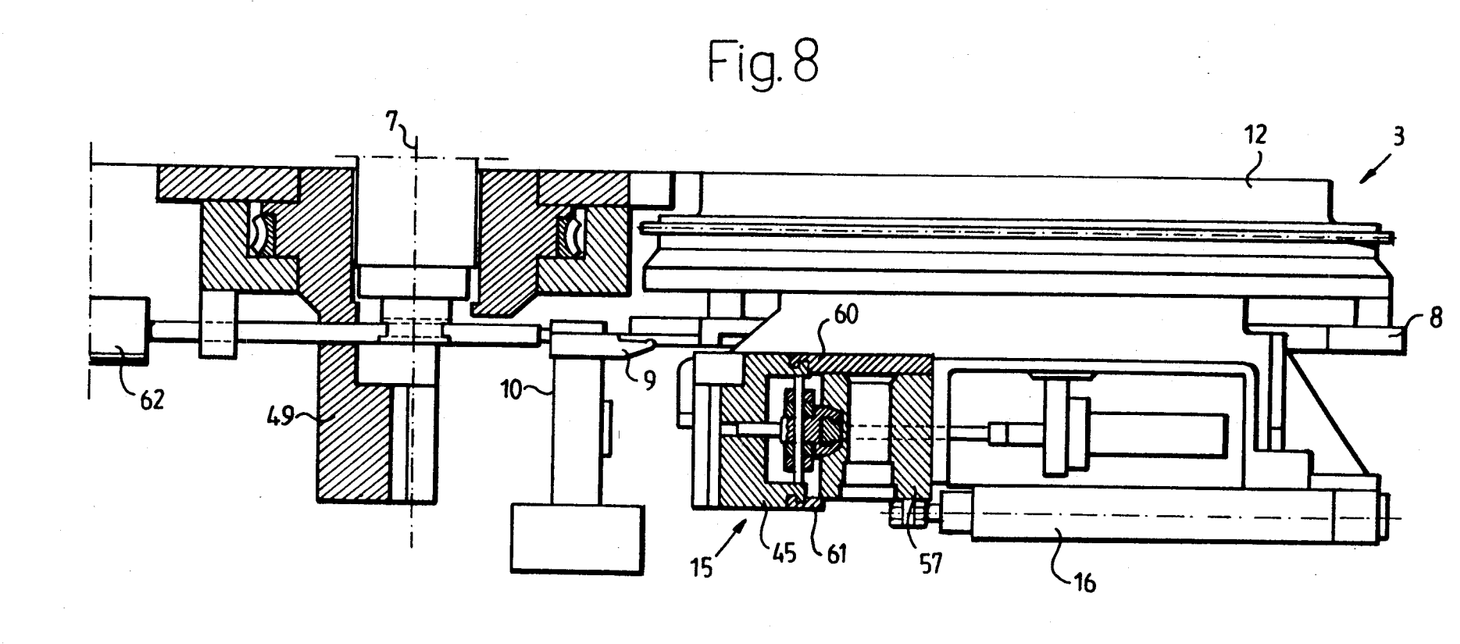
FIG. 8 is a longitudinal section through the operative parts of the upper tool holder, with a tool in the upper tool magazine in a position ready for being introduced into the upper tool holder.

FIG. 8 summarizes the operative devices for the changing of the punching tool. The gripping device 15 is in the ready position for gripping a punching tool 10, which is supported in the changing position on a tool carrier 9 attached to the ring 8 of the upper magazine 3. With the help of the slide-mounted gripping device 15, the punching tool 10 will be transferred from the magazine to its working position in contact with its retaining seat in the fixed part 49 of the upper tool holder. The punching tool is transferred in this way in a radial direction from the punch magazine 3 with the help of the gripping device 15, which is driven by the pressure cylinder 16, as described in greater detail below.

Figures 6, 6A:
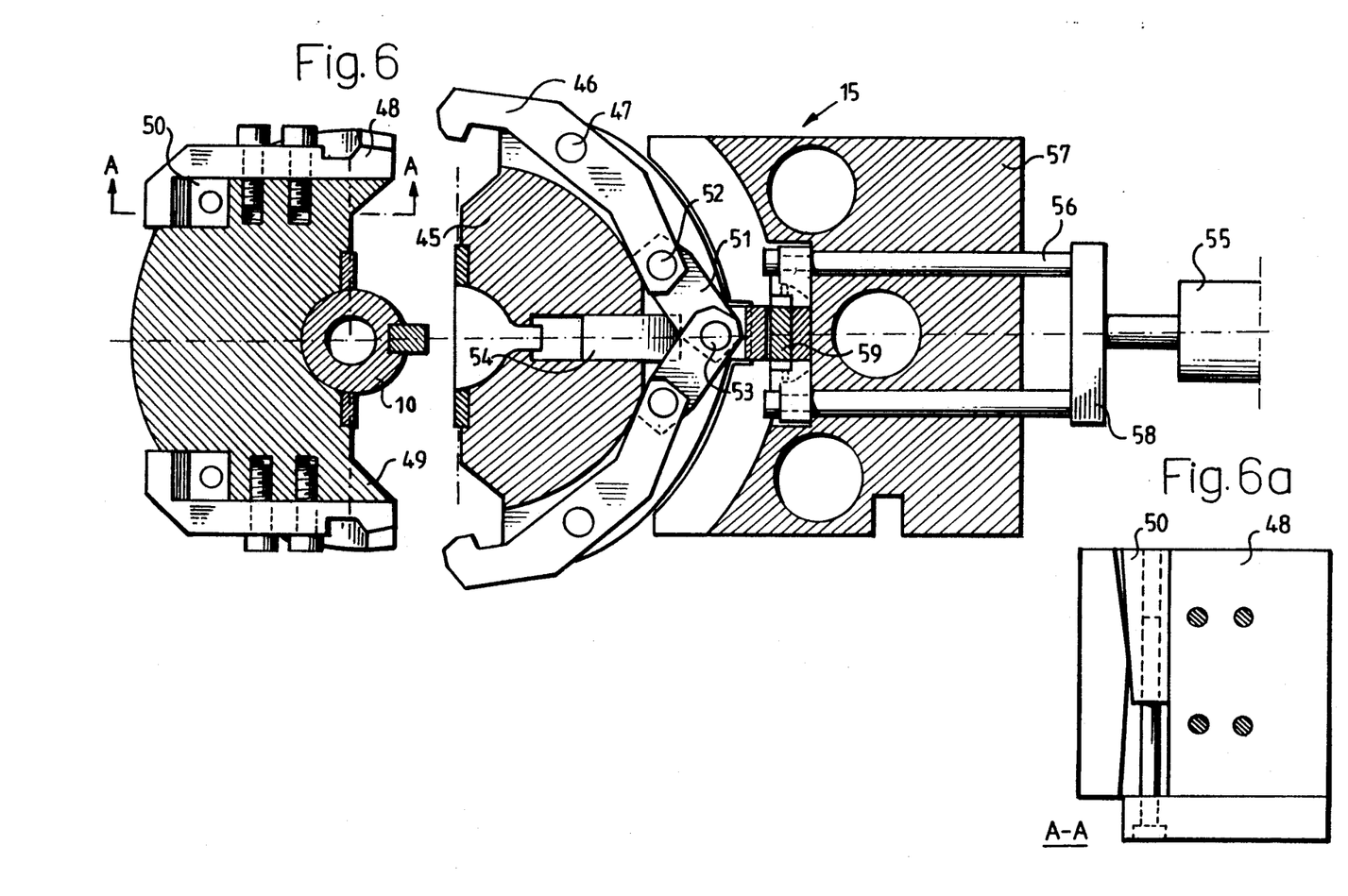
FIG. 6 is a horizontal section through the upper tool holder and shows the gripping device for locking both parts of the tool holder, in the open position.
FIG. 6a shows a tapered adjustment key for adjusting a holding device for the gripping device on the fixed part of the tool holder.
Figure 7:
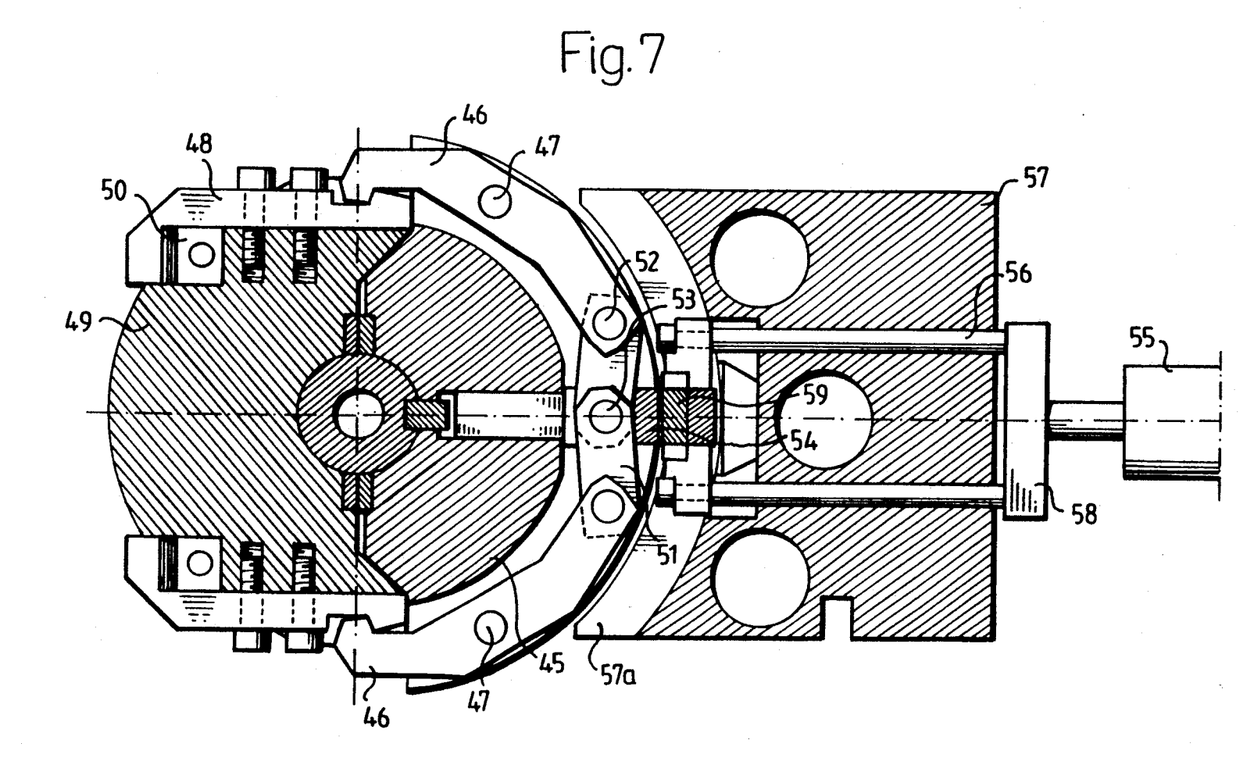
FIG. 7 is a sectional view showing the two parts of the upper tool holder in the connected position.

The gripping device 15 is illustrated in greater detail in FIGS. 6 and 7.

FIG. 6 shows the gripping device in the transfer position, with its gripping hooks or hook links 46 open. After bringing together the fixed part 49 and the moving part 45 of the tool carrier, with the punching tool accommodated between the parts, the fixed part and the moving part of the tool holder are connected together with the help of the hook links 46. These are mounted on vertical shafts 47 and are capable, when in the locked position, of being brought into engagement with the heels 48 on the stationary part 49 of the tool holder. The contact surface on these heels is plane, whereas the interacting surface on the hooks is curved. In order to permit the adjustment of the locking force, the positions of the heels can be adjusted with the help of tapered key elements 50 (FIG. 6a).

Figure 6B:
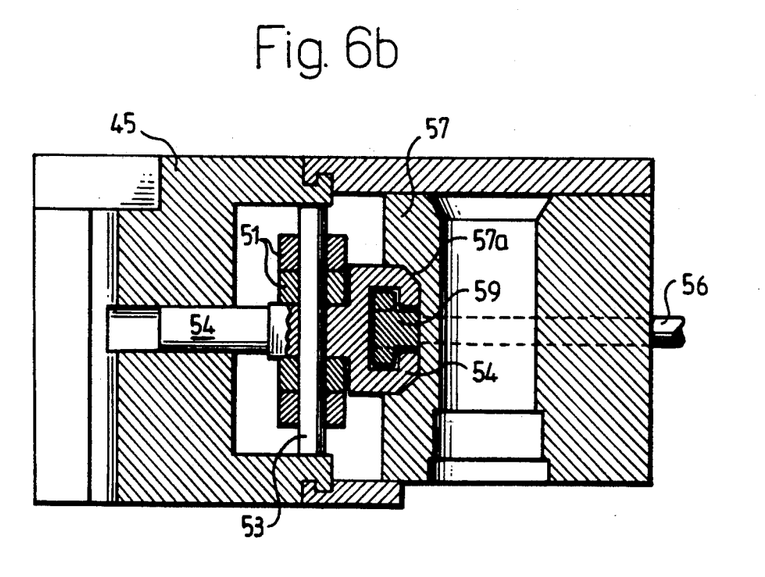
FIG. 6b is a longitudinal section view taken through a part of the gripping device shown in FIG. 6.

The hooks are connected to one another with a toggle joint, the links 51 of which are supported on the one hand with the pins 52 in the end part of the hook links 46, and are mutually attached on the other hand to the pin 53, which is similarly supported in the connecting piece 54. In order to guide the link system symmetrically, one end of the connecting piece 54 is executed as a cylindrical pin guided in a bore in the central plane of the moving part 45. The other end of the connecting piece is executed with a 'T'-groove open from the sides, as shown in FIG. 6b.

The locking arrangement is operated with the help of the pressure cylinder 55, the piston rod of which is connected to rods 56 which extend under guidance through the carrier housing 57. These rods are mutually connected to either side of the carrier housing by means of a yoke 58. Arranged on the yoke facing the tool mounting is a 'T'-piece 59, which fits in the 'T'-groove on the connecting piece 54. The coupling between the connecting piece 54 and the 'T'-piece 59 is executed in such a way that the connecting piece 54 in locked position of gripping device 15 (FIG. 7) can be rotated together with the moving part 45 and, in so doing, can be displaced in an annular recess 57a in the carrier housing 57. After bringing together both parts 45 and 49 of the tool holder, the parts of the locking arrangement adopt the position shown in FIG. 7, as described in greater detail below.

Figure 3:
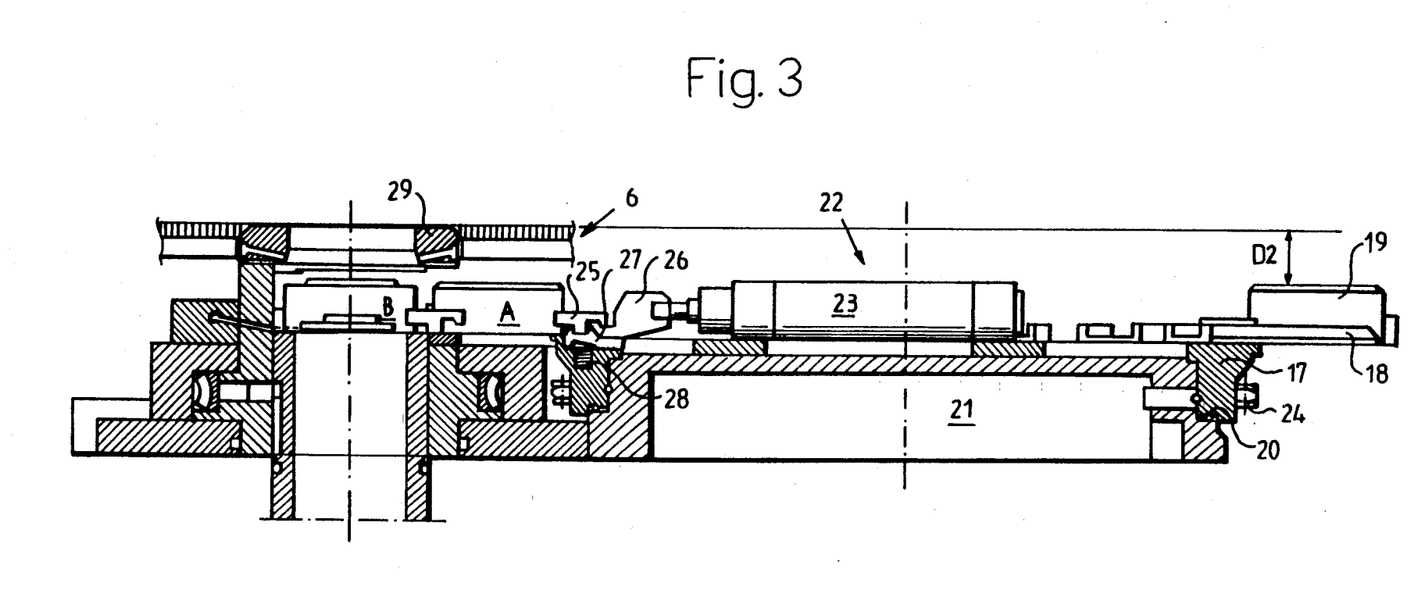
FIG. 3 is a corresponding partial longitudinal section through the lower tool magazine.

The lower magazine 4 for accommodating the die tools is shown in FIG. 3. The rotatable magazine is executed in a similar fashion to the upper magazine described above, but has no arrangement for the vertical displacement of the dies from a magazining position to a transfer position. The die tools 19 are supported in tool carriers 18 on a ring 17. As in the case of the upper magazine, the tool carriers are arranged in a radial fashion at regular intervals around the periphery of the ring 17. The ring is supported at 20 in a rotatable fashion about a housing 21 rigidly mounted on the lower part of the machine frame, which housing similarly constitutes an attachment for the tool changer 22 with its driving device 23 in the form of a pressure cylinder. The dies 19 contained in the magazine are situated at a distance $D_2$ from the underside of the workpiece, which rests on a support device 6. The ring 17 can be rotated by means of a chain transmission 24 in a similar manner to that in the upper tool magazine.

Every die tool is equipped with a locking element 25 with double hooks and facing inwards towards the centre of rotation of the magazine. The tool changer has an interacting hook element 26. Arranged directly in front of each tool carrier 18 is a further double locking hook 27, which is subjected to a loading acting in an upward direction by a spring 28. The die A is accommodated in the magazine in a position for horizontal transfer into the ready position B. From this ready position B, the die will be displaced vertically upwards in order to be guided into and retained in an annular holder 29 under vertical displacement over the distance $D_2$.

Figure 4:
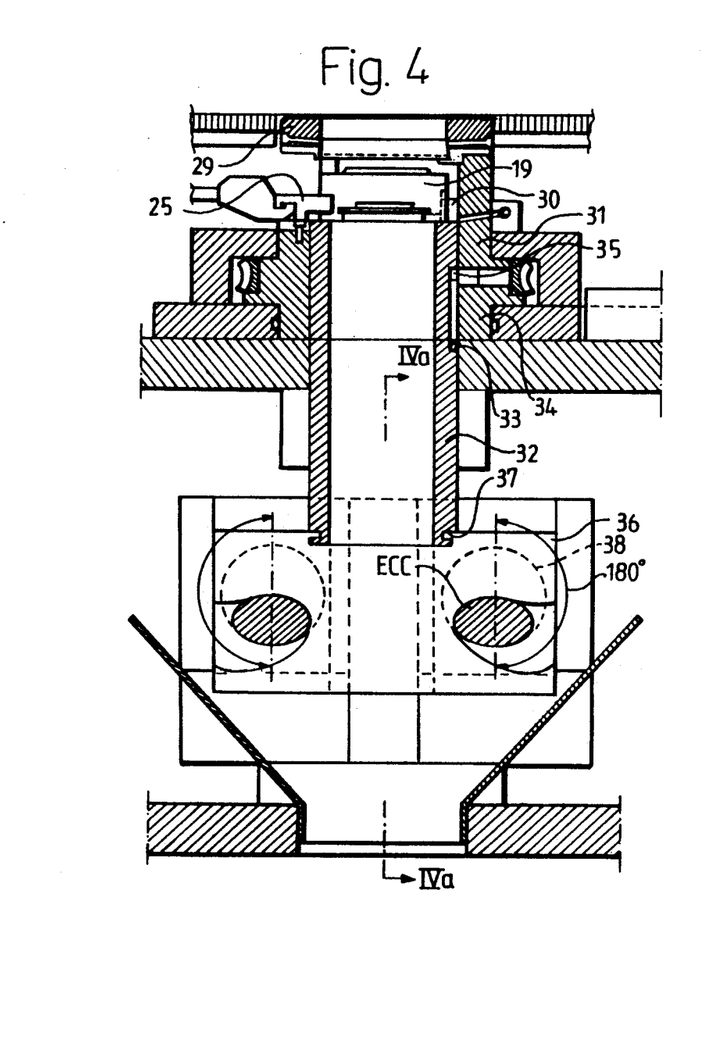
FIG. 4 is a section through the lifting mechanism for the die along the line IV—IV in FIG. 4a, in lower die position.
Figure 4A:
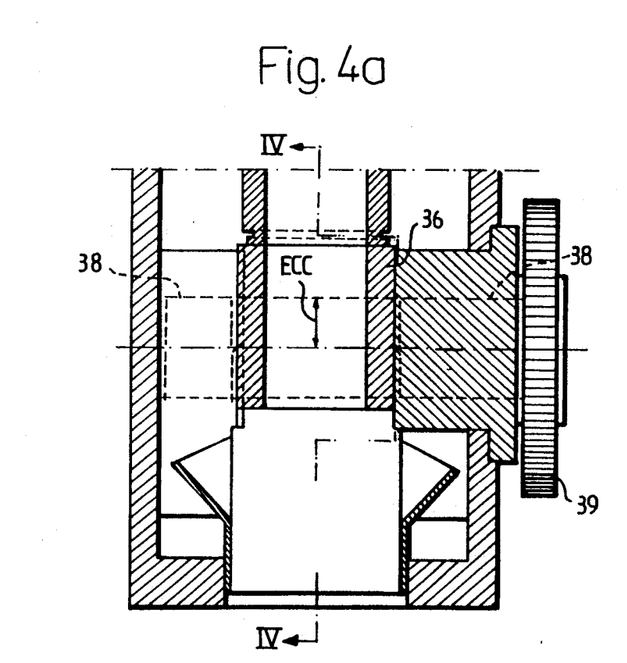
FIG. 4a is a section along the line IVa—IVa in FIG. 4, in elevated die position.

FIGS. 4 and 4a show the arrangement for raising the die tool over the aforementioned distance $D_2$. In the working position the die tool is fixed in the ring 29, which surrounds the die with a tight fit. A tapered key 30 on the die tool fits into a corresponding groove in the ring 29 for the purpose of fixing the die tool in the rotating position. The die is supported in the working position on a tubular, two-part piston 31, 32, which is capable of displacement in a vertical direction while being guided in surrounding fixed parts of the machine. The upper end of the upper piston part 31 has a 'T'-groove into which the die tool can be inserted sideways. The two piston parts 31 and 32 are capable of being rotated relative to one another while coupled together axially in the connecting part 33. In the changing position, i.e. when the hook 25 on the die tool is turned inwards towards the centre-line of the magazine, the piston elements are coupled together axially in this way. The upper piston part 31 is surrounded by a rotatable housing 34 equipped with a carrier 35 which engages in an interacting groove in the piston part. The die tool can be adjusted by this means to any desired angle.

The piston parts 31 and 32 are displaced vertically with the help of a lifting mechanism consisting of a cross-piece 36 on which the coupled piston parts rest. The lower piston part 32 is connected to the cross-piece via 'T'-grooves which engage in one another.

Figure 5:
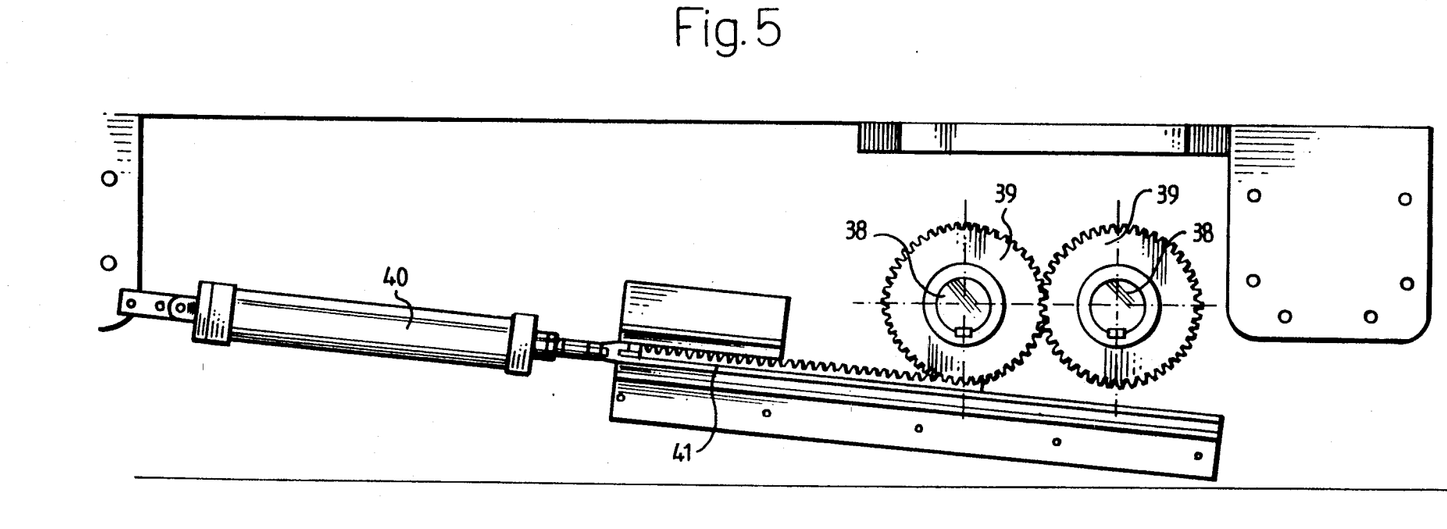
FIG. 5 shows the drive arrangement for the adjustment of the lower die tool.

The cross-piece 36 rests on two shafts 38 in a symmetrical arrangement to either side of the centre-line of the tool holder. These shafts are supported in the under part 2 of the frame of the machine. The central part of the shafts is executed as an eccentric part, preferably of elliptical cross-section. These eccentric parts are guided respectively in two openings in the sides of the cross-piece. The shafts are coupled together by means of toothed wheels 39 as shown in FIG. 5. A driving device such as a pressure cylinder displaces a slide-guided toothed rack 41, which is in engagement with one of the toothed wheels. The aforementioned coupling causes the respective shafts 38 to rotate in opposite directions. Rotation of the shafts 38 through 180° permits the cross-piece 36 to be raised and lowered for a distance corresponding to the double eccentricity of the aforementioned central parts of the shafts. The elliptical cross-section of the central parts of the shafts permits optimal lift and great eccentricity for a given shaft diameter.

Changing of the punching tool and the die tool takes place simultaneously, as follows.

Changing Punching Tools

The operating sequence for changing punching tools is executed in such a way that the associated upper tool magazine is lowered at the same time as the fastening of a punching tool accommodated in the upper tool holder is released, while the magazine is raised at the same time as a new punching tool is taken up and locked in the tool holder. In this way the time taken to change punching tools is prevented from being extended by the adjustment to the level of the magazine.

When inserting a new punching tool (see FIG. 8), the drive device 16 of the punch changing mechanism pushes the carrier housing 57 forwards. This housing is connected to the moving part 45 of the upper tool holder with the help of guide plates 60, 61 via grooves and cams which engage with one another and are concentric with the tool holder. In conjunction with the displacement in the direction of the fixed part 49 of the tool holder, a new tool in the magazine is taken up by the moving part 45, which needs only to exert a pressure against the tool in the transport direction towards its working position without the tool being gripped. Once the punching tool has reached its working position, the pressure cylinder 55 is activated and forces the connecting piece 54 in the direction towards the attachment part 45. In conjunction with this movement, the links 51, 51 are extended, with the consequence that the hook links 46 pivot inwards with their hooks behind the heels 48. The fixed part 49 and the moving part 45 of the tool holder will be drawn together by the appropriate inclination of interacting connecting surfaces. Once the connecting piece has been advanced to the point at which the links 51, 51 of the toggle joint are fully extended, the joint is contracted to its fullest extent. As the connecting piece is displaced further past the dead point of the toggle joint, this will continue its movement under its own power until a stop on the connecting piece comes into contact with the tool attachment. The system is self-locking in this way. This final overtravel also means that the connecting piece moves out of contact with the driving pressure cylinder and the existing free play between the 'T'-groove of the connecting piece and the 'T'-piece on the piston rod yoke 58 will allow rotation of the tool holder in contracted condition.

On opening the tool holder for changing the punching tool, the tool holder is rotated to the changing position, which means that the 'T'-groove on the connecting piece and the 'T'-piece on the piston rod yoke are brought into engagement. The locking cylinder 55 executes a return movement and in so doing carries the connecting piece over the dead point of the toggle joint and beyond in the direction away from the tool holder, so that the hook links 46 are moved out of engagement. The carrier housing 57 is then drawn back with the moving part 45 of the tool holder in the direction towards the centre of the upper tool magazine and into a position within the tool path of the magazine. A pressure cylinder 62 situated relative to the magazine on the opposite side of the tool holder, the piston rod of which cylinder faces towards the centre of the magazine, pushes the released punching tool across to the intended take-up position in the magazine and then returns to the starting position. The punching tools 10 have a flange head as shown and this head is received in a T-groove formed on the bottom and of the ram and which is open to receive the flanged heads of the punching tools 10 shown in FIG. 8. The pressure cylinder 62 piston rod easily ejects the punching tools after a punching operation and they are returned to the corresponding carriers 9, guided by laterally spaced conventional guides not shown.

Changing Die Tools

With the help of the pressure cylinder 40 (FIG. 5), the shafts 38, 38 are rotated through 180° so that the eccentric middle parts of the shafts are displaced from an upper position to a position vertically beneath the starting position. In conjunction with this the crosspiece 36 is lowered for a distance equivalent to two times the eccentricity of the eccentric parts. At the same time the coupled piston parts 31, 32 and the die tool 19 attached thereto are drawn vertically downwards so that the die tool is drawn downwards from its guide ring 29 and into the changing position. The hook 25 now engages in the hook element 26 on the protruding tool changer 22. The pressure cylinder 23 then draws the die tool from its position B to the position A in the lower tool magazine (FIG. 3). The magazine is rotated so that the desired tool arrives at the changing position A. The pressure cylinder 23 now pushes forwards its hook element 26, which first moves the locking hook 27 out of the way in order then to transport the new die tool to position B, where it is guided into its 'T'-groove in the piston part 31. The cross-piece 36 is raised with the help of the eccentric shafts 38, and the die tool is guided into the guide ring 29, where it is retained in the working position while resting against the piston parts 31, 32 supported by the cross-piece 36.

I claim:

1. Apparatus of the type for working on a workpiece by punching, nibbling and similar working operations requiring the use of paired, coactive tools comprising:

a punching tool upper magazine having a rotably drive punching tool magazine ring holding and storing a plurality of punching tools releasably held peripherally thereon spaced circumferentially for rotationally delivery individually, sequentially to a changing position for transferring thereof from said punching tool magazine ring individually;

means in said upper magazine including said punch tool magazine ring for cyclically lifting the punching tool magazine ring to a raised position in which the punching tools are stored disposed at a level in which the punching tools are spaced above a level at which a workpiece is fed to the apparatus and for cyclically lowering said punching tool magazine ring for effecting transfer of punching tools individually at said changing position for a corresponding working operation on said workpiece;

a fixed punching tool holder for receiving sequentially punching tools transferred thereto individually at the changing position thereof from the lowered punching tool magazine ring for a corresponding working operation on said workpiece;

a punching tool gripper device for sequentially transferring individually punching tools radially from said punching tool magazine ring when individually disposed at said changing position thereof in registry laterally with said fixed punching tool holder while said punching tool magazine ring is in a lowered position;

a die tool lower magazine having a rotatably driven die tool magazine ring for holding and storing a plurality of die tools peripherally thereon circumferentially spaced for rotational delivery individually and sequentially to a transfer position for transferring thereof individually to a ready position for readiness to cooperate with a corresponding individual punch tool in a corresponding working operation on the workpiece;

a die tool transfer device operable cyclically for sequentially transferring individually the die tools radially from the die tool magazine ring while at the transfer position thereof to said readiness position for subsequent delivery sequentially to a working position for coaction each with a corresponding punching tool in a corresponding working operation and for subsequently restoring the individual die tools sequentially from said readiness position to said die tool magazine ring after each said corresponding working operation on the workpiece;

an annular die tool holder disposed for receiving the die tools individually in a sequence for coating with a corresponding punch tool during each said corresponding working operation on the workpiece;

means operable cyclically for receiving at said readiness position the die tools individually from said die tool transfer device in sequence and cyclically delivering the die tools sequentially vertically into said annular die tool holder and maintaining the individual die tools vertically in position in said die tool holder during coaction with a corresponding punching tool during a corresponding working operation on said workpiece and subsequently cyclically lowering the individual die tools from said annular die tool holder after said working operation to said readiness position for restoration to said die tool magazine ring by said die tool transfer device, and means for restoring individually the die tools to said die tool magazine ring after each said corresponding working operation.

2. Apparatus according to claim 1, in which said means for cyclically lifting said punching tool magazine ring and for lowering said punching tool magazine ring comprises means within the circumference of said punching tool magazine ring for lifting and lowering said punching tool magazine ring during rotational travel of said punching tool magazine ring positioning said punching tool individually at the changing position thereof.

3. Apparatus according to claim 1, in which said punching tool gripping device comprises a reciprocally movable part advanced from a retracted position for engaging and transferring the punching tools individually in sequence radially of the punching tool magazine ring on to said fixed punching tool holder and returned to said retracted position, and means for reciprocally advancing said movable part and returning said movable part to said retracted position.

4. Apparatus according to claim 3, in which said gripping device movable part comprises pivotally mounted hook links thereon a self-locking articulated system in said punching tool gripping device for operating the hook links to an open position when the movable part is retracted and operating the hook links to a gripping position gripping said fixed punching tool holder in a releasable self-locking condition when the movable part is advanced and transfers individual punching tools to said fixed punching tool holder for holding the transferred individual punching tools between the moveable part and the fixed punching tool holder.

5. Apparatus according to claim 4, in which said hook links have hooks on free ends thereof hooked to said fixed punching tool holder, and said fixed punching tool holder having recesses thereon for releasably receiving a respective hook of a corresponding hook link.

6. Apparatus according to claim 1, in which said means operable cyclically for receiving the die tools individually and cyclically delivering the die tools sequentially vertically comprises a reciprocable piston disposed vertically below said annular die tool holder, and means for reciprocating said piston and holding the individual die tools on said piston in said annular die tool holder during a working operation between a die tool and a corresponding punching tool.

7. Apparatus according to claim 6, in which said piston has an upper part and a lower part relatively rotatable and axially coupled, said upper part being operably disposed for receiving individual die tools at said readiness position for vertical delivery into said annular die tool holder.

8. Apparatus according to claim 7, in which said means operable cyclically for receiving the die tools individually and cyclically delivering the die tools sequentially vertically comprises a vertically movable crosspiece coupled to said piston for moving said piston reciprocably vertically, and means for reciprocating said crosspiece vertically.

9. Apparatus according to claim 8, in which said means for reciprocating said crosspiece vertically comprises a pair of rotatable parallel shafts each traversing said crosspiece and having a respective eccentric camming portion for respectively camming said crosspiece upwardly and downwardly, a reciprocably driven gear rack for selectively rotating said shafts, in opposite directions, each shaft having a gear meshing with each other, and one of said gears meshing with said gear rack.

10. Apparatus according to claim 9, in which means for reciprocating said crosspiece vertically includes a fluid-actuated cylinder reciprocably driving said gear rack.

* * * * *